Figure 1:
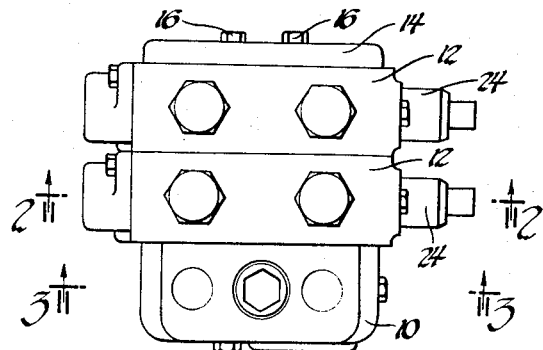

United States Patent [19]
Farrell et al.

[11] 3,774,635
[45] Nov. 27, 1973

[54] POWER TRANSMISSION

[75] Inventors: Robert G. Farrell, Royal Oak; Carl R. Binkley, Warren, both of Mich.

[75] Assignee: Sperry Rand Corporation, Troy, Mich.

[22] Filed: Apr. 18, 1972

[21] Appl. No.: 245,103

[52] U.S. Cl............ 137/614.2, 137/608, 137/625.68
[51] Int. Cl......................... F16k 13/00, F16d 1/00
[58] Field of Search.................... 137/614.2, 614.01, 137/614, 608, 625.68

[56] References Cited
UNITED STATES PATENTS

| | | | |
|---|---|---|---|
| 3,357,451 | 12/1967 | Tennis | 137/614.2 X |
| 3,375,845 | 4/1968 | Behm | 137/614 X |
| 3,255,777 | 6/1966 | Rice et al. | 137/625.68 |
| 3,014,498 | 12/1961 | Stephens | 137/614.2 X |
| 3,556,147 | 1/1971 | Sizer | 137/608 |

Primary Examiner—Samuel Scott
Assistant Examiner—Ira S. Lazarus
Attorney—Theodore Van Meter

[57] ABSTRACT

A directional valve for a hydraulic power system has a body adapted to be clamped into a bank of valves and has a spool slidable within the body to direct fluid flow between a pressure fluid source and a hydraulic motor. The body includes auxiliary valves such as a load compensating flow regulator, a load-drop check valve, a cylinder port relief valve, and a cylinder port anti-cavitation valve and the spool includes one or more counterbalance valves. Load sensing passages in the body direct load pressure to the compensator valve and to the pressure source for controlling the volume of fluid delivered from the source. The body is designed for maximum symmetry with the spool bore near the middle of the iron mass to minimize distortions caused by aging of the iron by temperature differences and by the pressure force of the fluid.

7 Claims, 7 Drawing Figures

POWER TRANSMISSION

Directional valves for use in hydraulic systems commonly utilize a spool slidable in a bore in the valve body to direct fluid flow between the source and the fluid motor or other service device. Particularly in circuits supplying more than one service device, various auxiliary valves are required to minimize the interaction of one circuit upon another when two or more are in operation. The introduction of such auxiliary valves into the same body with the spool type valve or as attachments thereto has heretofore required bulky and heavy construction and has, so far as bank type valves are concerned, complicated the problem of clamping and sealing together the various sections of the bank, requiring additional clamping bolts and extra space in the body to receive them in isolation from the auxiliary valves and their associated passages.

Spool type directional valves designed for high operating pressures of the order of 4,000 and 5,000 p.s.i. require very close fits between the spool and the body if leakage losses are to be kept within acceptable limits. Close fits, however, become sensitive to body distortions which arise from the natural growth of iron castings, from the unequal expansion of the body due to temperature rises, and from high pressure within the internal passages in the body. These distortions make the spool difficult to shift manually and frequently cause complete seizures.

Another difficulty which has arisen with multiple unit or bankable valves arises when two or more circuits are simultaneously in operation and it is desired to throttle or meter the flow to each of them. If the loads require different operating pressures and fluctuate from moment to moment, reliable speed control of the lesser loaded service device or devices becomes very difficult.

The present invention aims to provide a spool type hydraulic valve which may be incorporated in a bank of valves and which may utilize any or all of the various auxiiary valves which particular applications require, which may operate with close fits for very high pressures and with the substantial absence of body distortions and in which good metering or speed control is achieved under all conditions.

These advantages are achieved by the provision of a hydraulic valve unit comprising a generally rectangular body having a spool bore extending from end to end of the rectangle and lying substantially mid-way between its sides, the body having a thickness approximately double the spool bore diameter, a supply port traversing the body thickness and lying mid-way between the ends of the body, a pair of holes to receive clamping bolts traversing the body thickness and spaced from the supply port toward the ends of the body, a pair of exhaust ports traversing the body thickness and spaced from said holes toward the ends of the body, the supply port, the bolt-receiving holes and the exhaust ports lying generally along a line parallel to and at one side of the spool bore, passages connecting the supply port and the exhaust ports with the spool bore, passages on the other side of the bore extending to that side of the body to constitute service ports, and a flow directing spool slidable in the spool bore, the body having substantially equal quantities of metal on either side of the spool bore whereby distortion of the bore due to unequal expansion of the metal caused by aging or by temperature rise is minimized.

IN THE DRAWINGS

Figure 4:
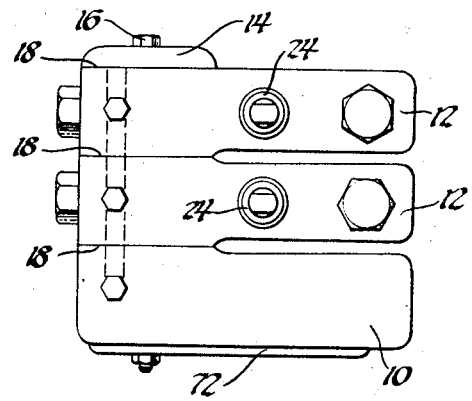
Figure 2:
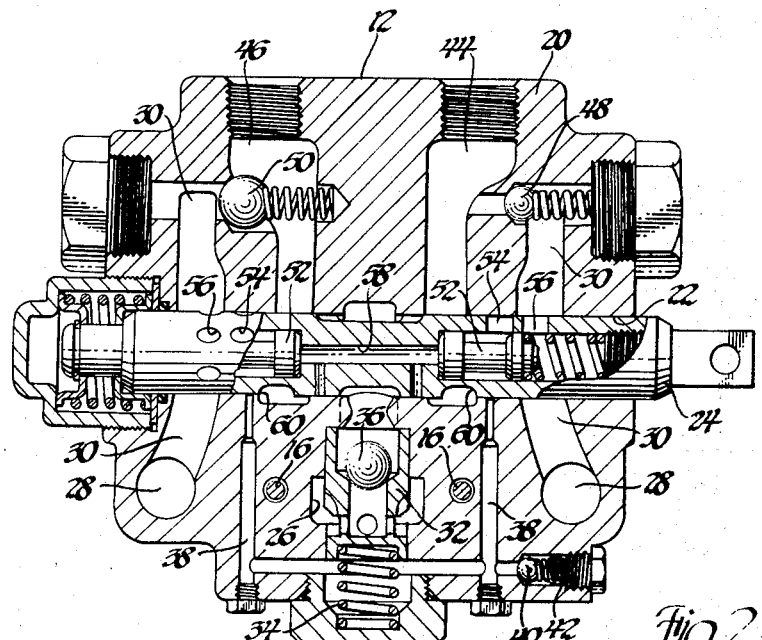
Figure 3:
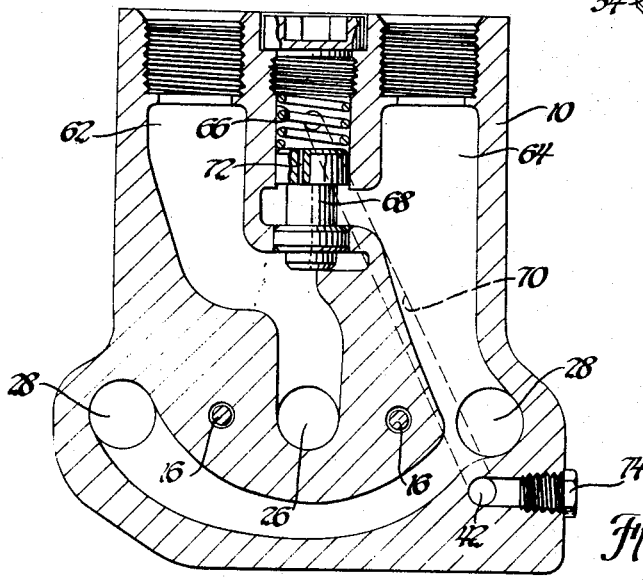
Figure 5:
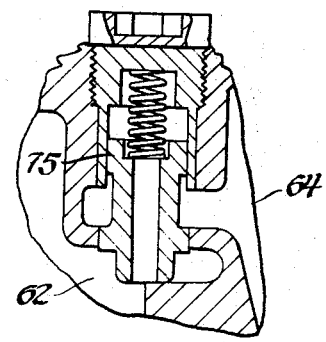
Figure 6:
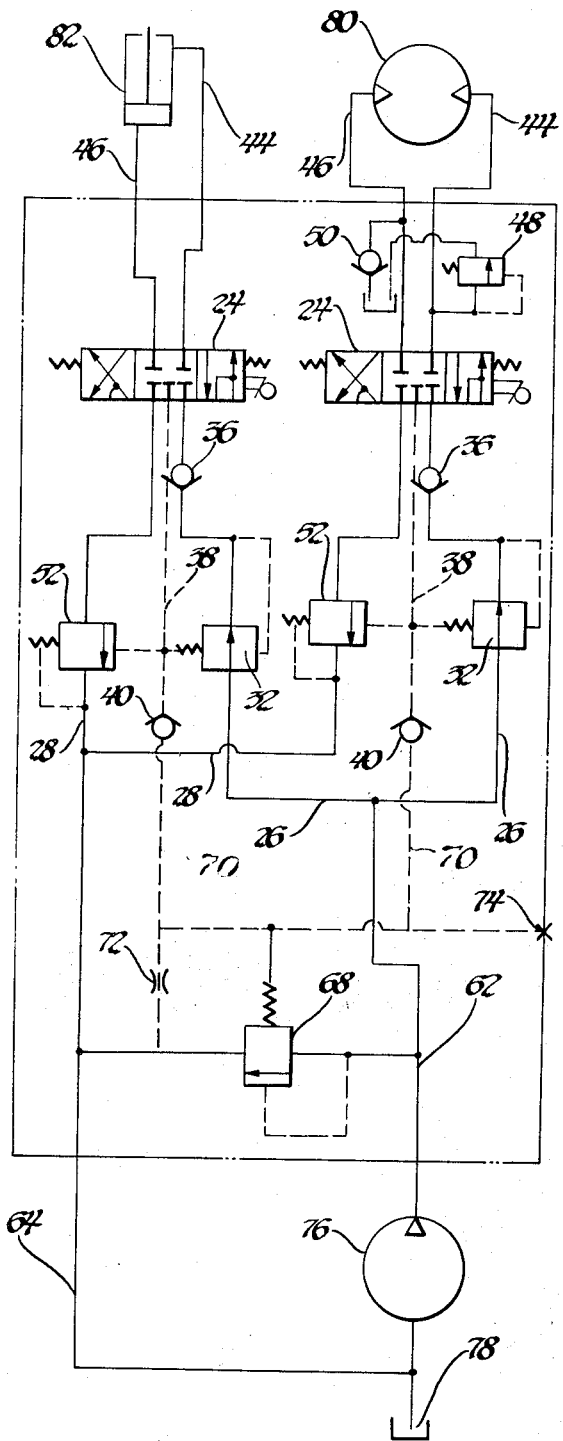
Figure 7:
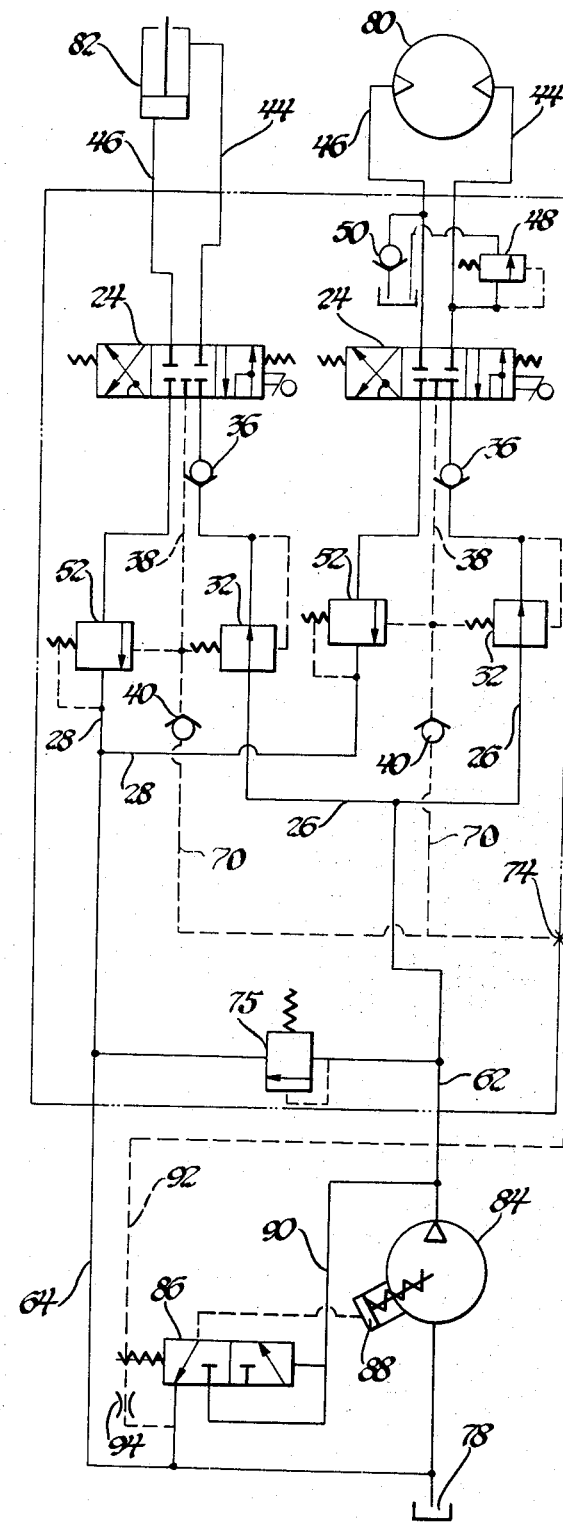

FIG. 1 is a top view of a valve bank incorporating a preferred form of the present invention.
FIG. 2 is a cross section on line 2—2 of FIG. 1.
FIG. 3 is a cross section on line 3—3 of FIG. 1.
FIG. 4 is an end view of the valve bank of FIG. 1.
FIG. 5 is a view corresponding to a fragment of FIG. 3 and illustrating a modification.
FIG. 6 is a circuit diagram of a hydraulic power transmission system corresponding to FIGS. 1 through 4.
FIG. 7 is a circuit diagram of a hydraulic power system incorporating the modification of FIG. 5.

The valve bank illustrated in FIG. 1 comprises a supply and return section 10, two sectional valves 12, and an end plate 14, all of which are clamped together by two through-bolts 16. As seen in FIG. 4, the various sections of the bank have flat mating surfaces 18 which are gasketed to seal the fluid passages extending between the units of the bank. These surfaces and gaskets extend only over about the lower third of each of the sections 10 and 12.

Referring now to FIG. 2, each valve section 12 comprises a body 20 which is generally of rectangular form with left and right-hand ends and top and bottom sides. Substantially mid-way between the sides is a valve spool bore 22 extending from end to end and receiving a slidable spool 24. Thus, the bore 22 has substantially equal amounts of metal, usually cast iron, on either side of the spool. The body thickness is preferably about twice the spool diameter or a little greater.

The body 20 at the lower side in FIG. 2 contains a symmetrical array of passages and holes extending through the thickness of the body. These include the supply port 26, the two unnumbered holes for the bolts 16 and the two exhaust ports 28. Internal passages 30 connect the exhaust passages 28 with the bore 22 and extend upwardly approximately an equal distance into the other side of the body. A load compensating valve 32 is biased by a spring 34 and the hydraulic force difference between its top and bottom areas to a variably restrict flow from supply port 26 to the bore 22 at its center portion. A ball check valve 36 within the valve 32 acts to prevent dropping of a load in the event another valve in the bank should not be maintaining adequate pressure in the connecting supply port 26. The lower side of the body contains a pair of sensing passages 38 which communicate with the bottom of the load compensating valve 32 and also, at the right-hand end, connect through a check valve 40 with a through-port 42 extending from section to section of the bank.

On the upper side of the spool bore 22, there is provided a pair of service passages 44 and 46 extending to the usual terminals for connection with a fluid motor or other service device. The upper side extensions of the exhaust passages 30 provide communication for auxiliary valves such as a service port relief valve 48 and a service port anti-cavitation valve 50. Alternatively more complex auxiliary valves, not illustrated, may combine these functions for each service port and can be placed at these locations. Cross port relief valves can be incorporated.

The valve spool 24 is preferably hollow and contains one or more counterbalance valves 52 which control communication between a first series of escape holes 54 and a second series 56. The counterbalance valves are spring biased toward the center and one or the other is opened by supply pressure in the central passage 58 whenever the valve is shifted to the right or to the left. The spool 24 also has lands 60 which selectively open one or the other of the sensing passages 38 when the valve is shifted. Because the spool is non-rotatable in its bore, the holes 54 or 56 do not uncover sensing passages 38 when the valve is shifted, so that only one sensing passage 38 at a time can be opened, and that is the one then communicating with a service passage 44 or 46.

Referring now to FIG. 3, the supply and return section 10 comprises a supply passage 62 which connects with the supply port 26 and a return passage 64 which connects with both exhaust passages 28. A central bore 66 contains an unloading valve 68 which controls communication between passages 62 and 64 and is spring biased downwardly. The sensing passage 42 which extends through the bank of valves communicates by a passage 70 contained within a boss 72 (FIGS. 1 and 4) with the upper end of the bore 66. A restricted passage 72 through the upper head of the valve 68 allows a continuous restricted flow out of the sensing passages 38, 42, and 70. The passage 42 has a terminal connection 74 which is plugged for use with supply sources consisting of a fixed displacement pump and an unloading valve, commonly referred to as an open center system, and which may be connected to the control device of a variable displacement pump when used for a closed center system with the modified valve illustrated in FIG. 5.

In FIG. 5, the supply and return section 10 has in place of the unloading valve 68 and the sensing passage 70, only a balanced relief valve 75, its upper piston head being of slightly smaller diameter than its lower piston head, and which serves to limit the maximum pressure in the supply passage 62.

FIG. 6 illustrates diagrammatically a hydraulic system of the open center type in which a fixed displacement pump 76 withdraws fluid from a reservoir 78 and delivers it to the supply passage 62 of the section 10 and to the supply ports 28 of each of the sections 12. Exhaust ports 28 of sections 12 and return passage 64 of section 10 return fluid to the reservoir 78. The service passages 44 and 46 connect with service devices such as a rotary fluid motor 80 and the hydraulic cylinder 82.

In the central position of the valve spool 24, as illustrated in FIG. 2, the sensing passages 38 are closed by the spool land 60 and consequently pressure therein is dissipated through the restricted orifice 72 (FIG. 3) so that the entire delivery of the pump 76 is bypassed from passage 62 to passage 64 by the consequent opening of the valve 68. When valve spool 24 is shifted, for example to the right in FIG. 2, fluid is supplied from port 26 through the load compensating valve 32 and the load drop check valve 36 to the service passage 44 and the service device. Fluid returning from the service device enters passage 46 where it meets the holes 54 of the spool which at the start are closed off from the holes 56 by the counterbalance valve 52. However, as operating pressure builds up in passage 44, this shifts the counterbalance valve to allow communication from holes 54 to holes 56 and exhaust passage 30. The counterbalance valve 52 prevents overrunning of the service device at a speed faster than the pump can deliver fluid to it. In the event that the service device is subject to extreme overloads, the service port relief valve 48 will open to limit the pressure in the service passage 44 and the anticavitation valve 50 will open to maintain the service passage 46 filled.

With the valve spool 24 shifted to the right, the land 60 at the right-hand end uncovers the right-hand sensing passage 38. This causes the load compensating valve 32 to maintain a constant pressure drop across the spool-body orifice controlling flow of supply fluid into the service passage 44. In this way, the quantity of fluid passing to the service passage 44 is maintained constant at a given position of spool 24 regardless of the difference in pressure between supply port 26 and service passage 44.

In addition, the rate of fluid supply from the inlet passage 62 to the supply port 26 in section 10 is automatically adjusted to meet the total requirements of the valve bank. This takes place through the action of the unloading valve 68 which responds to the differential pressure between that in passage 62 and that in the sensing passage 42–70. This latter receives the highest of the various pressures in sensing passages 38 of the different valve sections. Sections having lower pressures at their service devices are cut off from the through-sensing passage 42 by closure of their respective check valves 40.

Referring now to FIG. 7, the hydraulic circuit diagram there illustrated is similar to FIG. 6 except that the pressure source is a variable displacement pump 84 and that the system is a closed center system. Rather than the unloading valve 68 and its controlling passage 70 in FIG. 3, the section 10 contains the relief valve 76 of FIG. 5. In addition, the through-sensing passage 42 is connected by means of the terminal 74 with a pilot valve 86 which controls the displacement regulator 88 of the pump 84. The pilot valve 86 is subject to delivery pressure through a conduit 90 at its right end and, at its left-hand end, to the highest of the pressures in the service ports 44 as transmitted through the sensing passages 38, 42, 74, and 92. The pilot valve 86 may contain an internal restricted passage 94 corresponding to the passage 72 illustrated in FIG. 3. By this means, the delivery rate of the pump 84 is maintained at that necessary to supply only the total requirements at any moment of all the valve units or sections in the bank which, of course, depends upon the manual position of adjustment of each valve spool.

The design of the valve body 20 (FIG. 2) places substantially equal amounts of iron on either side of the spool bore 22 so that aging and temperature expansions of the body take place uniformly on both sides of the bore 22 and do not introduce distortions causing the bore to depart from a true right cylinder. In addition, the location of the joining or sealing surfaces 18 between adjacent units of the valve bank is symmetrical with respect to the clamping bolts 16 with the supply port 26 at the center and the exhaust ports 28 at either end, also this surface and the three bolts are located below the valve spool bore. Any distortion due to these bolts will not cause bind. This symmetrical construction avoids sealing difficulties previously experienced with other designs.

We claim

1. A hydraulic valve unit comprising a generally rectangular body having a spool bore extending from end to end of the rectangle and lying substantially mid-way between its sides, the body having a thickness approximately double the spool bore diameter, a supply port traversing the body thickness and lying mid-way between the ends of the body, a pair of holes to receive clamping bolts traversing the body thickness and spaced from the supply port toward the ends of the body, a pair of exhaust ports traversing the body thickness and spaced from said holes toward the ends of the body, the supply port, the bolt receiving holes, and the exhaust ports lying generally along a line parallel to and at one side of the spool bore, passages connecting the supply port and the exhaust ports with the spool bore, passages on the other side of the bore extending to that side of the body to constitute service ports, and a flow directing spool slidable in the spool bore, the body having substantially equal quantities of metal on either side of the spool bore whereby distortion of the bore due to unequal expansion of the metal caused by aging or by temperature rise is minimized.

2. A valve unit as defined in claim 1 having a pair of sensing passages extending from the spool bore toward the one side of the body, a pressure compensator valve in the supply passage and having an end exposed to the sensing passages.

3. A valve unit as defined in claim 2 wherein means is provided for communication of only one sensing passage with only one of the service passages at any one time.

4. A valve unit as defined in claim 1 having a relief valve connecting one of the service ports with an exhaust passage at the other side of the spool bore.

5. A valve unit as defined in claim 1 having a check valve connecting one of the exhaust passages with the service passage at the other side of the spool bore.

6. A valve spool as defined in claim 1, the spool being hollow and containing at least one counterbalance valve responsive to supply pressure in one service port to open the other service port to exhaust through the hollow spool.

7. A valve unit as defined in claim 1, the spool being hollow and containing a pair of counterbalance valves, means on the spool for connecting one counterbalance valve to the supply passage when the spool is shifted and for disconnecting the other counterbalance valve at the same time.

* * * * *